Figures 1, 2:
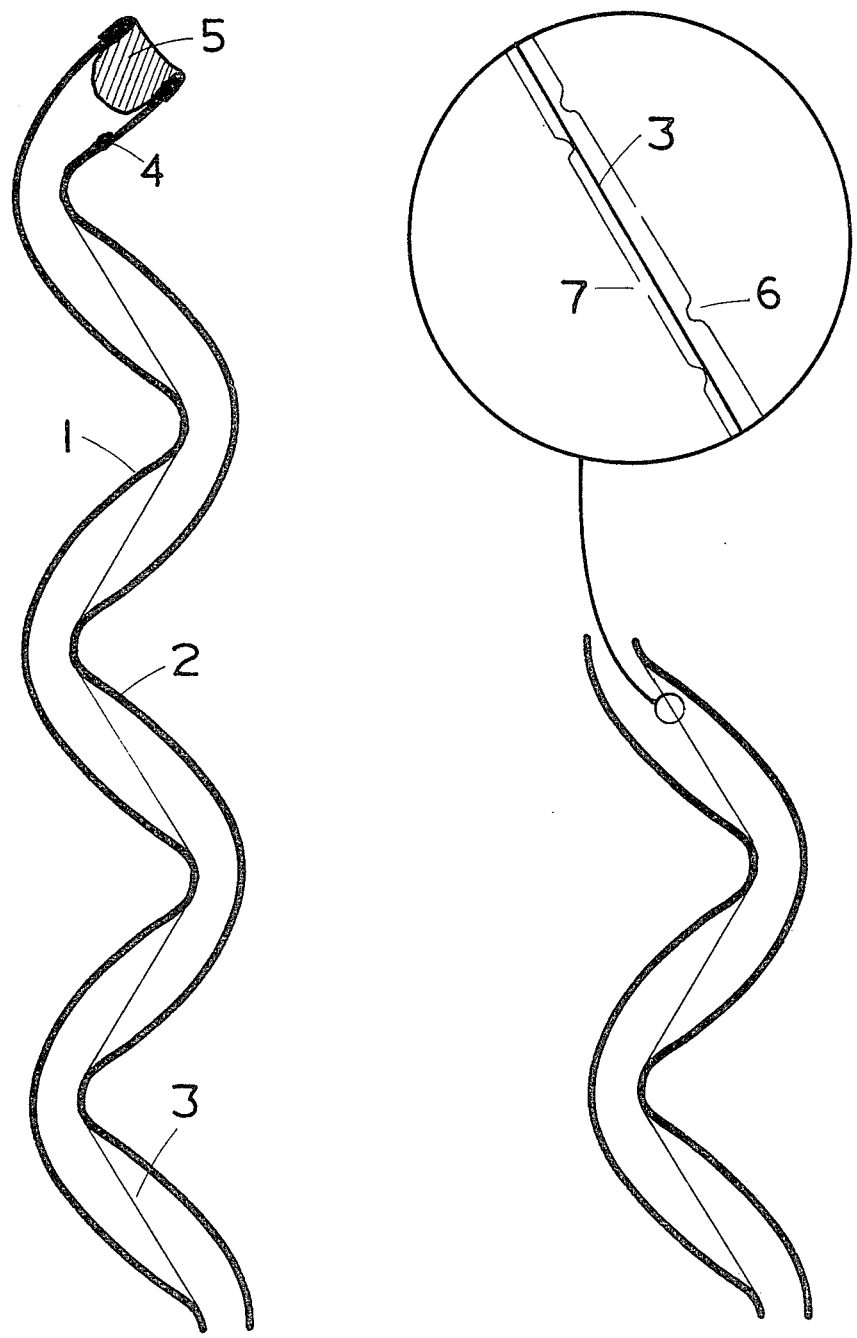

United States Patent [19]

Rathmell

[11] 4,317,854

[45] Mar. 2, 1982

[54] VACUUM-INSULATED PANEL

[76] Inventor: Richard K. Rathmell, 12 Pine Tree Rd., Ramsey, N.J. 07446

[21] Appl. No.: 47,167

[22] Filed: Jun. 11, 1979

[51] Int. Cl.³ .............................................. B32B 3/28
[52] U.S. Cl. ..................................... 428/182; 52/171; 52/2; 52/231; 52/306; 52/307; 52/308; 428/34; 428/69; 428/184
[58] Field of Search ..................... 428/34, 35, 69, 182, 428/184; 52/231, 306, 307, 308, 171, 2

[56] References Cited
U.S. PATENT DOCUMENTS
3,936,553  2/1976  Rowe ..................................... 428/69

Primary Examiner—George F. Lesmes
Assistant Examiner—E. Rollins Buffalow

[57] ABSTRACT

A vacuum-insulated thin-wall panel requires internal spacers to resist the compressive force of the atmosphere and to hold the sides apart. Such spacers are paths for heat flow by conduction. However, in the panel of this invention, the sides are held apart by a web of relatively thin and long spacers stressed in pure tension. Heat flow through such spacers is substantially less than through the more massive spacers designed to be stressed in compression.

4 Claims, 2 Drawing Figures

VACUUM-INSULATED PANEL

BACKGROUND OF THE INVENTION

Compared to conventional fibrous or foam insulation, the superior heat-keeping or cold-keeping characteristics of a vacuum-insulated Thermos bottle are well known. However, large vacuum-insulated panels are not now commonly used because available designs do not perform as well as a small vacuum bottle, and equivalent poor performance can be achieved with foam or fibrous materials at lower cost.

Factors that favor vacuum insulation are:
1. A good vacuum substantially eliminates heat losses due to conduction, convection, and infiltration.
2. Vacuum-insulated panels can be substantially thinner than panels insulated to an equivalent degree with foam or fibrous material.
3. Moisture cannot penetrate a vacuum insulation and destroy it with ice accumulation, as it can with low temperature applications of foam or fiber insulation.

On the other hand, some disadvantages of large vacuum-insulated panels are:
1. Large thin-wall panels require internal spacers to resist the compressive force of the outside atmosphere and to hold the sides apart. These spacers, which must support over one ton per square foot of panel, have been significant paths for heat flow by conduction through the panel.
2. Heat flow by radiation can be significant through a vacuum, particularly at higher temperatures or when the inside surfaces of the hollow panel are not mirror-bright.
3. It is not easy to achieve and to maintain the low pressures reportedly used in vacuum bottles, around $10^{-3}$ Torr (approximately one millionth of normal atmospheric pressure). The edge seals must be designed to accommodate the thermal expansion of the warm side of the panel relative to the cooler side. Gases dissolved in metals and moisture absorbed on glass and metal surfaces can be released slowly to impair a high vacuum unless heat is applied during the evacuation or long evacuation periods are used. Most rubber and plastic materials also contain gases or they allow gases to diffuse through them.

A general review of heat transfer mechanisms may be helpful toward understanding this invention. Heat may flow through a panel or partition by any combination of the following mechanisms:
A. Conduction: Heat flows through a stationary material.
B. Convection: A recirculating fluid carries heat from a warmer surface to a cooler surface, or from a warmer fluid to a cooler fluid.
C. Radiation: A warmer surface emits electromagnetic type waves to a cooler surface in visual sight or to outer space.
D. Infiltration or exfiltration: A warmer fluid passes through a partition and is replaced by a cooler fluid.

Different materials have different tendencies to conduct heat. These tendencies can be measured and reported as "the coefficient of thermal conductivity." In British units, the standard path for heat flow is one square foot in cross section area, and the path is one inch long. The amount of heat per unit of time, or B.T.U. per hour, transferred per degree of temperature difference is reported as the coefficient. Such coefficients may vary with both the temperature and the purity of material tested. Some reported coefficients are shown below.

| Material | Coefficient of Thermal Conductivity (B.T.U./hour ft$^2$ °F./inch) |
|---|---|
| Copper | 2600 |
| Aluminum | 1400 |
| Steel | 320 |
| Stainless Steel | 110 |
| Glass | 7 |
| Concrete | 3 |
| Polyester Plastic | 1.6 |
| Polystyrene foam | 0.24 |
| Still Air | 0.16 |
| (Vacuum) | 0.000 |

It is obvious that thicker walls conduct proportionately less heat. For walls that are made of two or more materials, or are hollow, or insulated, it is more convenient to measure an overall "U Factor." Some reported values are:

| Panel or Wall Construction | U Factor (B.T.U./hr ft$^2$ °F.) |
|---|---|
| 8" concrete blocks, faced with brick; air space between | 0.4 |
| as above, with additional gypsum wall board and air space | 0.18 |
| Sheet steel on both sides of 1½ inch fiberglass | 0.14 |

Heat transfer by radiation is normally relatively small compared to heat transfer by the other mechanisms at ambient temperatures or less. Radiation losses increase with the fourth power of the absolute temperature, °R., as follows:

| °F. | °R | (R/100)$^4$ | Ratio |
|---|---|---|---|
| −30 | 430 | 342 | 0.43 |
| 0 | 460 | 448 | 0.57 |
| 70 | 530 | 789 | 1.00 |
| 140 | 600 | 1296 | 1.64 |
| 240 | 700 | 2401 | 3.04 |
| 340 | 800 | 4096 | 5.19 |

Radiant energy (infra-red radiation at ambient temperatures) readily passes through a vacuum. At the next surface, this energy is either absorbed, reflected, transmitted, or some combination of these. In an ideal vacuum insulation system, the internal surface would reflect all the radiant energy.

It is not practical to make a perfect vacuum or a perfect reflector. Measurements of the U Factor of a common Thermos bottle showed the following:

| Temperature Range | U Factor | Equivalent thickness Polystyrene foam |
|---|---|---|
| Boiling water to room temperature | 0.071 | 3.38 inches |
| Ice water to room temperature | 0.036 | 6.67 inches |

Data on the degree of vacuum and the percent reflectivity of the inside surfaces were not available.

OBJECT OF THIS INVENTION

The basic object is to improve the design of large vacuum-insulated panels to make them economical relative to the use of conventional foam or fiber insulation. It is understood that large thin-wall vacuum-insulated panels must have two principal sides, edge seals, and internal spacers to prevent the collapse of the evacuated space. Toward the achievement of the basic object, intermediate objectives are as follows:

1. To provide spacers which conduct a minimum amount of heat.
2. To provide panel surfaces such that one side thermal expansion will not overstress the edge seal, even for very large panels.
3. To provide a hollow panel which can be evacuated to $10^{-3}$ Torr or less, and which will maintain such pressures for many years or indefinitely.
4. To provide a panel which is relatively efficient at stopping the flow of radiant heat.

PRIOR ART

Several U.S. patents describe evacuated panels with internal spacers to resist the compressive forces of the outside atmosphere. In U.S. Pat. No. 2,728,958, a compressible insulation is cited. In U.S. Pat. No. 3,161,265, some preferred shapes of columns to minimize heat conductivity are discussed. In U.S. Pat. No. 3,936,553, columns made of epoxy-fiberglass and nylon are described. In U.S. Pat. No. 4,132,218, steel columns having spherical ends are described. The use of honeycomb type spacers has been noted, even though they would be more difficult to evacuate.

Numerous types of edge seals have been described, generally to allow for some expansion of one side and to minimize heat flow through the seals. The patents noted above contain some descriptions.

To stop the flow of radiant energy, the use of mirror finishes is well known, and the use of multiple layers of reflective materials is known. See U.S. Pat. No. 1,910,703 and U.S. Pat. No. Re. 29,804.

The use of "gas getters" to facilitate evacuation and to maintain low pressure in a sealed space is known. Activated barium is cited in U.S. Pat. No. 3,161,265.

DESCRIPTION OF INVENTION

FIG. I shows a sectional view of part of a hollow evacuated panel. As with known types of such panels, there is an impervious side 1, an impervious side 2, and an edge seal 5. A reduced pressure or vacuum is held between the sides.

Line 3 of FIG. I represents an important element in this invention. This line represents an edge view of a web, which may be fibers stressed in tension, or, alternatively, it may be a film or a foil stressed in tension by the compressive force of the atmosphere. It is anchored to side 2 at location 4, and also anchored at the other end of the panel which is not shown.

The advantage of using a web stressed in tension is that the path for heat flow by conduction can be much smaller in cross-sectional area, and relatively long, compared to the dimensions and heat conductive properties of any spacer designed for compressive or flexural loads.

It is well known that any structural member or column which carries a compressive force must be sufficiently massive to avoid failure by buckling or bending, and that a short column is less likely to fail than a long one. However, the more massive and shorter the column, the more it can transmit heat by conduction from one end to the other end. In contrast, when the same force is carried by a structural member stressed in tension, the member may be relatively thin and long. The thinner and longer it is, the less it can conduct heat by conduction from one end to the other end.

A key feature of this invention is that the structural members, or spacers, designed to carry compressive loads, do not extend from one side of the panel to the other side, but they reach instead to a web which is between the two sides and stressed in tension. The web, in effect, becomes the "bottle neck" which limits heat transfer by conduction from hot side of the panel to the cold side of the panel.

Example #1

A panel structure as illustrated in FIG. I has two metal sides with corrugations three inches apart and $1\frac{1}{8}$ inches deep. Atmospheric air pressure of 14.7 psi on the outside of the evacuated panel develops a compressive force of over 2000 lb/ft$^2$ which must be carried by structural members or spacers in order to prevent collapse of the evacuated space. The corrugations 3 inches apart can carry this load without bending, but as illustrated, they do not reach or touch the opposite panel. They reach instead to a web of glass fibers which is between the two sides of the panel and stressed in tension at an angle of 30° relative to the plane of the panel. These fibers have a design stress of 40,000 psi from the atmosphere, versus a breaking strength of 400,000 psi. For one square foot of panel area, the heat conductive path through the fibers is only:

$$\frac{14.7 \text{ psi}}{40,000 \text{ psi (sine } 30°)} = \frac{0.000735 \text{ ft}^2 \text{ glass fiber}}{\text{ft}^2 \text{ panel surface}}$$

The length of each fiber heat path is 1.54 inches, and the U Factor for this amount of glass is:

$$U = \frac{7 \text{ B.T.U. inch}}{\text{hr °F. ft}^2} \cdot \frac{0.000735 \text{ ft}^2}{\text{ft}^2} \cdot \frac{1}{1.54 \text{ in.}} = \frac{0.00333 \text{ B.T.U.}}{\text{hr °F. ft}^2}$$

This value of 0.00333 should be compared with and added to the 0.036 measured for the Thermos bottle. It also can be seen that each fiber is stressed 8 times per foot of panel length, where the length is measured in line with the fiber. Therefore, the required cross-sectional area of glass fiber per foot of panel width is only 0.000092 ft$^2$, (0.000735/8).

Example #2

A panel structure as illustrated in FIG. I has corrugations six inches apart and $2\frac{1}{4}$ inches deep, or two times larger than Example #1. Glass fibers are used to carry the load of the atmospheric pressure. They are stressed to the same degree as Example #1. The total glass path area per ft$^2$ panel is the same, but each path is two times longer. Therefore, the heat carrying capacity of the glass fibers is one-half as much, and the U Factor contribution is about 0.0017. The required cross-sectional area of glass per foot of panel width is two times greater, or 0.000184 ft$^2$.

Example #3

A panel has the same geometry as in Example #2, but instead of glass fibers, a web of stainless steel foil is used, stressed to 25,000 psi at a 30° angle. The thermal path area is:

$$\frac{14.7 \text{ psi}}{25,000 \text{ psi (sine 30°)}} = \frac{0.00117 \text{ ft}^2 \text{ stainless steel}}{\text{ft}^2 \text{ panel surface}}$$

The heat carrying capacity is:

$$\frac{110 \text{ B.T.U. inch}}{\text{hr °F. ft}^2} \cdot \frac{0.00117 \text{ ft}^2}{\text{ft}^2} \cdot \frac{1}{3.08 \text{ in.}} = \frac{0.042 \text{ B.T.U.}}{\text{hr °F. ft}^2}$$

This value of 0.042 is relatively large compared to 0.036, but there is some benefit in that a foil layer interrupts or reflects the radiant heat flow. Radiant heat flow is the important mechanism to control after an adequate vacuum is achieved and maintained. Moreover, to the extent that the vacuum is not perfect, a film or foil also acts to reduce convective heat transfer.

Example #4

A panel has the same geometry as in Example #2, with the same amount of glass fiber in the web. However, these fibers are bonded to an aluminized Mylar (polyester) film one mil thick. The additional heat path is:

$$\frac{(0.001 \text{ inch}) (12 \text{ inches}) (4 \text{ times}) (\text{ft}^2)}{(\text{ft}^2) (144 \text{ inch}^2)} = \frac{0.00033 \text{ ft}^2 \text{ polyester}}{\text{ft}^2 \text{ panel}}$$

The aluminum coating is one millionth of an inch thick. The additional U Factor for the aluminum is:

$$\frac{(0.000001) (12) (1400)}{(144) (3.08)} = \frac{0.00015 \text{ B.T.U}}{\text{hr ft}^2 \text{ °F.}}$$

The sum of these, 0.00048, is small compared to 0.0017 for the glass fiber. The radiant and convective heat transfer is approximately halved when the web is as reflective as the inside surface of each metal side.

Example #5

A panel is similar to that in Example #4, except that the web is built up to a total of three aluminized films of polyester. The three films are held apart from each other by spacers which are not parallel to the glass fibers and, therefore, do not contribute to the conductive heat path. Heat transfer by radiation and convection are reduced to about one-fourth of that through an "empty" vacuum chamber having interior surfaces that are as reflective as aluminized polyester. The insulation value of the panel is calculated to be equivalent to twenty inches of polystyrene foam.

From the foregoing examples, it can be seen that an important part of this invention is the concept of using a web of material stressed in tension to hold the sides of the evacuated panel apart. The web may consist of discrete fibers or it may consist of a film or foil, a fiber-reinforced film or foil, or a matrix of woven or unwoven fibers. The material comprising the web preferably should have a high ratio of tensile strength to coefficient of thermal conductivity, and it should be relatively inexpensive, long-lasting, and not impaired by high or low temperatures.

Preferably, the web should be constructed to be highly reflective to radiant heat. For instance, the web may be a composite of materials including glass fibers or the like for strength, and a plastic film to support a very thin highly-reflective metal coating. Aluminized coatings on Mylar (polyester) are well known, but other coatings on other substrates may be used within the scope of this invention. The web may be built up to include one or more additional reflective films to further reduce radiant heat transfer. All reflective films should be spaced apart from each other and from the sides of the panel to the maximum practical extent to minimize conductive contact. It is known that reflective films have been spaced apart in the other evacuated panels, but the spacers carried the compressive load of the outside atmosphere or fluid. Better economy and better performance can be achieved with low-mass spacers designed to support only the weight of the reflective film. As illustrated in FIG. 2, the film may be dimpled, as at 6, to hold most of the surface area away from the adjacent film. Also, to facilitate the evacuation of a panel which includes one or more additional films in a composite web, it is preferable to perforate the films as at 7, in FIG. 2. The shape of the corrugations allows thermal expansion of one side without overstressing the end seal. Metal sides, glass, and polyester can be heated to facilitate evacuation.

It is obvious that many specific designs can incorporate the concepts described in this disclosure. For instance, the web may be stressed at angles other than 30°. Instead of a corrugated side, internal ribs can transmit the compressive force from a substantially flat external side to the web. The panels may be curved to serve a cylindrical tank, or a panel can be constructed to maintain an evacuated space around a 90° corner. Fluid pressure other than atmospheric air may require a stronger web. The webs may be anchored to a side with adhesives or with mechanical fasteners.

What is claimed is:

1. An improved vacuum-insulated panel of the type having an evacuated space between two impervious sides and sealed edges, and compressively-loaded spacers to hold the sides apart, wherein the compressively-loaded spacers do not reach from one side of the panel to the other side, but reach instead to a web which is stressed in tension and positioned between the two sides.

2. An improved vacuum-insulated panel as in claim 1, wherein each side of the panel is corrugated to provide said compressively loaded spacers, the inside ridges of the corrugation contacting the web and not the other side of the panel.

3. An improved vacuum insulated panel as in claim 1, wherein the web includes a highly reflective coating on a film.

4. An improved vacuum insulated panel as in claim 1, wherein the web includes two or more films with reflective coatings, and the films are dimpled to minimize surface contact with each other.

* * * * *